Patented Jan. 25, 1949

2,460,223

UNITED STATES PATENT OFFICE 2,460,223

SULFONIUM METHOSULFATES

John N. Hansen, Albert Lea, Minn., assignor to The Dow Chemical Company, Midland, Mich., a corporation of Delaware No Drawing. Application September 10, 1947, Serial No. 773,302

4 Claims. (Cl. 260—457)

This invention relates to new sulfonium methosulfate compounds and particularly those having the following general formula

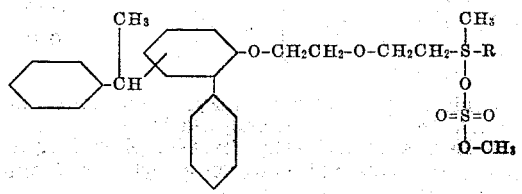

wherein R represents an alkyl group containing 2, 3 or 4 carbon atoms.

Representative members of the above identified group of compounds have been prepared and found to be viscous oils characterized by a fortunate combination of properties in that they are soluble in water, of high germicidal and bactericidal effectiveness, substantially odorless, of low volatility, stable, and relatively non-irritating to the skin of humans and animals. These compounds have been found valuable for the control of microorganisms.

The new compounds are conveniently prepared by reacting an ethyl, propyl or butyl mercaptan with beta - (2 - phenyl - alphaphenylethyl - phenoxy)-beta'-chloro-diethyl ether to form a sulfide of the formula

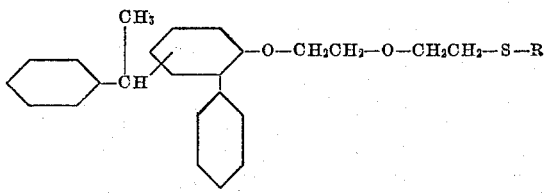

wherein R represents ethyl, propyl or butyl. This sulfide is then reacted with dimethyl sulfate to obtain the desired compound of the invention.

The beta-(2 - phenyl - alphaphenylethyl - phenoxy)-beta'-chloro-diethyl ether employed as a reactant herein is described in U. S. Patent No. 2,297,728 as an oily product boiling at 243°–250° C. at 2 millimeters pressure, and having a specific gravity of 1.14 at 25/25° C.

The following examples illustrate the invention, but are not to be construed as limiting:

Example 1

90 grams (1 mol) of normalbutyl mercaptan, 40 grams (1 mol) of sodium hydroxide, 380.5 grams (1 mol) of beta-(2-phenyl-alphaphenylphenoxy)-beta'-chloro-diethyl ether, 75 milliliters of water and 1 liter of ethanol were mixed together and heated to boiling temperature and under reflux for 22 hours. The major proportion of the ethanol was then recovered by fractional distillation under reduced pressure, and the residue from the distillation operation diluted with water to dissolve precipitated sodium chloride. The mixture was then extracted with benzene and the benzene distilled off to recover as a residue 421 grams of normalbutyl beta-(2-phenyl-alpha-phenylethylphenoxy)-ethoxy-ethyl sulfide as a straw colored viscous oil.

86.8 grams (0.2 mol) of this sulfide and 25.2 grams (0.2 mol) of dimethyl sulfate were reacted together by heating at 70° C. for 21 hours. The crude reaction product was dissolved in a small amount of ethanol, and thereafter diluted with diethyl ether to throw out of solution the sulfonium reaction product. This oily product was separated by decantation, washed with diethyl ether, and warmed under reduced pressure to remove traces of solvent. From these operations, there was obtained 103 grams of normalbutyl methyl beta-(2-phenyl-alphaphenylethyl-phenoxy)-ethoxy-ethyl sulfonium methosulfate as a straw colored viscous oil completely soluble in water and ethanol and relatively insoluble in diethyl ether.

Example 2

In a similar fashion, 190.25 grams (0.5 mol) of beta - (2 - phenyl - alphaphenylethyl - phenoxy)-beta'-chloro-diethyl ether, 45 grams (0.5 mol) of secondarybutyl mercaptan, 20.8 grams (0.5 mol) of sodium hydroxide, 37.5 milliliters of water and 500 milliliters of ethanol were reacted together to obtain as a principal product of reaction, 218 grams of secondarybutyl beta-(2-phenyl-alpha-phenylethyl-phenoxy)-ethoxy-ethyl sulfide as a straw colored free-flowing oil.

108.5 grams (0.25 mol) of this sulfide and 31.5 grams of dimethyl sulfate (0.25 mol) were mixed together and heated at 70° C. for 21 hours. The crude reaction product was then separated substantially as described in Example 1 to recover 103.5 grams of secondarybutyl methyl beta-(2-phenyl-alphaphenylethyl-phenoxy)-ethoxy-ethyl sulfonium methosulfate as a light viscous oil completely soluble in water, relatively insoluble in diethyl ether, and having good emulsifying properties.

Example 3

A similar operation was carried out in which normalpropyl mercaptan was substituted for the normalbutyl mercaptan set forth in Example 1. The reaction mixture of the mercaptan, complex organic halide, caustic, water, and ethanol was heated to a boiling temperature and under reflux for 22 hours. The crude product was then treated in the usual manner to recover a quantitative yield of normalpropyl beta-(2-phenyl-alphaphenylethyl-phenoxy)-ethoxy-ethyl sulfide as an oily free-flowing product.

105 grams (0.25 mol) of this sulfide product was reacted with 31.5 grams (0.25 mol) of dimethyl sulfate by heating at 68°–72° C. for 21 hours. The crude product of the reaction was then cooled and successively treated with ethanol and diethyl ether as described in Example 1 to recover a substantially quantitative yield of normalpropyl methyl beta-(2-phenyl-alphaphenylethyl-phenoxy)-ethoxy-ethyl sulfonium methosulfate as a light yellow viscous oil miscible with water in all proportions, soluble in ethanol, and relatively insoluble in diethyl ether.

Example 4

0.5 molecular proportions of isopropyl mercaptan, sodium hydroxide, and beta-(2-phenyl-alphaphenylethyl-phenoxy)-ethoxy-ethyl chloride were reacted together in the presence of 37.5 milliliters of water and 500 milliliters of ethanol in the manner described in Example 1. The solvent was recovered by fractional distillation and the residue diluted with water and extracted with benzene in the usual manner to recover 208.5 grams of the desired isopropyl beta-(2-phenyl-alphaphenylethyl-phenoxy)-ethoxy-ethyl sulfide product as a light yellow viscous oil.

105 grams (0.25 mol) of this sulfide product was then reacted with 31.5 grams (0.25 mol) of dimethyl sulfate by heating at 68°–72° C. for 21 hours. The product of reaction was recovered as described in the preceding example in the form of 136.5 grams of a viscous straw colored oil readily soluble in water and ethanol, substantially insoluble in diethyl ether, and consisting essentially of isopropyl methyl beta-(2-phenyl-alphaphenylethyl-phenoxy)-ethoxy-ethyl sulfonium methosulfate.

Example 5

A further preparation was made in which 31.0 grams of ethyl mercaptan was substituted for the isopropyl mercaptan employed in Example 4. The organic sulfide reaction product was isolated as a straw colored free-flowing oil. 101.64 grams (0.25 mol) of this sulfide was then reacted with 31.5 grams (0.25 mol) of dimethyl sulfate by heating at 70° C. for 21 hours. The resulting product was a light yellow oil readily soluble in water and ethanol, difficultly soluble in diethyl ether, and consisting essentially of ethyl methyl beta-(2-phenyl - alphaphenylethyl - phenoxy) - ethoxy-ethyl sulfonium methosulfate.

I claim:

1. A compound having the formula

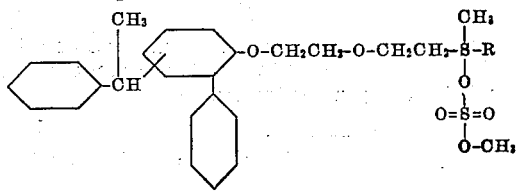

wherein R represents an alkyl group containing from 2 to 4 carbon atoms, inclusive.

2. Normalbutyl methyl beta-(2-phenyl-alphaphenylethyl-phenoxy)-ethoxy-ethyl sulfonium methosulfate.

3. Isopropyl methyl beta-(2-phenyl-alphaphenylethyl-phenoxy) - ethoxy-ethyl sulfonium methosulfate.

4. Secondarybutyl methyl beta-(2-phenyl-alphaphenylethyl-phenoxy)-ethoxy-ethyl sulfonium methosulfate.

JOHN N. HANSEN.

No references cited.